US012732327B2

(12) United States Patent
Yang et al.

(10) Patent No.: US 12,732,327 B2
(45) Date of Patent: Sep. 8, 2026

(54) METHOD AND APPARATUS FOR DYNAMIC PDCCH MONITORING GROUPS SWITCHING

(71) Applicant: QUALCOMM Incorporated, San Diego, CA (US)

(72) Inventors: Luanxia Yang, Beijing (CN); Changlong Xu, Beijing (CN); Jing Sun, San Diego, CA (US); Xiaoxia Zhang, San Diego, CA (US); Hao Xu, Beijing (CN)

(73) Assignee: QUALCOMM Incorporated, San Diego, CA (US)

(*) Notice: Subject to any disclaimer, the term of this patent is extended or adjusted under 35 U.S.C. 154(b) by 608 days.

(21) Appl. No.: 17/997,121

(22) PCT Filed: Jun. 28, 2020

(86) PCT No.: PCT/CN2020/098465
§ 371 (c)(1),
(2) Date: Oct. 25, 2022

(87) PCT Pub. No.: WO2022/000116
PCT Pub. Date: Jan. 6, 2022

(65) Prior Publication Data

US 2023/0188297 A1 Jun. 15, 2023

(51) Int. Cl.
*H04L 5/00* (2006.01)
*H04W 72/1273* (2023.01)
*H04W 76/15* (2018.01)

(52) U.S. Cl.
CPC .......... *H04L 5/0053* (2013.01); *H04L 5/0094* (2013.01); *H04W 72/1273* (2013.01); *H04W 76/15* (2018.02)

(58) Field of Classification Search
None
See application file for complete search history.

(56) References Cited

U.S. PATENT DOCUMENTS

2018/0049168 A1* 2/2018 Ryu .......................... H04L 5/00
2019/0123992 A1 4/2019 Ly et al.
(Continued)

FOREIGN PATENT DOCUMENTS

CN 109644099 A 4/2019
CN 109792364 A 5/2019
(Continued)

OTHER PUBLICATIONS

International Search Report and Written Opinion—PCT/CN2020/098465—ISA/EPO—Mar. 18, 2021.
(Continued)

*Primary Examiner* — The Hy Nguyen
(74) *Attorney, Agent, or Firm* — QUALCOMM Incorporated

(57) ABSTRACT

The apparatus of wireless communication includes a UE and a base station. The base station may transmit, to the UE, a configuration for a plurality of PDCCH monitoring groups for monitoring different sets of search spaces. The plurality of PDCCH monitoring groups may include a first PDCCH monitoring group with a first number of PDCCH monitoring occasions and a second PDCCH monitoring group with a second number of PDCCH monitoring occasions different from the first number. The base station may determine which PDCCH monitoring group to send a PHCCH, and transmit the PDCCH to the UE. The UE may determine to monitor search spaces of the PDCCH monitoring group, and monitor search spaces corresponding to the PDCCH monitoring group. The UE may switch between the first and second
(Continued)

PDCCH monitoring groups based on a condition or an indication from the base station.

25 Claims, 11 Drawing Sheets

(56) References Cited

U.S. PATENT DOCUMENTS

2019/0305867 A1 10/2019 Tseng et al.
2020/0029330 A1* 1/2020 Nam ..................... H04L 5/0094
2020/0351682 A1* 11/2020 Cirik .................... H04B 7/0695
2022/0217579 A1* 7/2022 Seo ................... H04W 72/0446
2022/0264649 A1* 8/2022 Lin ................... H04W 74/0866
2022/0353895 A1* 11/2022 Xu ........................ H04L 5/0098

FOREIGN PATENT DOCUMENTS

CN 109802814 A 5/2019
CN 110383729 A 10/2019
CN 110876179 A 3/2020
CN 111095988 A 5/2020
WO 2018031327 A1 2/2018

OTHER PUBLICATIONS

Ericsson: "UE Power Saving Using Search Space Set Switching", 3GPP TSG RAN WG1 #100-Bis-e, Tdoc R1-2002417, 3rd Generation Partnership Project, Mobile Competence Centre, 650, Route Des Lucioles, F-06921 Sophia-Antipolis Cedex, France, vol. RAN WG1, No. e-Meeting, XP051875613, Apr. 11, 2020, April 20-Apr. 30, 2020, pp. 1-5, Sec. 1, Sec.2.1, Sec.2.3.
Supplementary European Search Report - EP20943243 - Search Authority - 2024-02-19 (205850EP).

* cited by examiner

100
IP Services
176
IP Services
197
EPC
160
164
Other MMEs
168
MBMS GW
170
BM-SC
174
HSS
162
MME
166
Serving Gateway
172
PDN Gateway
132
Core Network
190
193
Other AMFs
196
UDM
192
AMF
194
SMF
195
UPF
184
198
dynamically switching between PDCCH monitoring groups
120
102
104
158
110
134
102/180
182'
182
182''
102 (102')
110 (110')
152
154
150

An example of DL channel with search spaces and PDCCH monitoring groups

METHOD AND APPARATUS FOR DYNAMIC PDCCH MONITORING GROUPS SWITCHING

CROSS REFERENCE TO RELATED APPLICATION(S)

This application is a National Phase entry of PCT Application No. PCT/CN2020/098465, entitled "METHOD AND APPARATUS FOR DYNAMIC PDCCH MONITORING GROUPS SWITCHING" and filed on Jun. 28, 2020, which is expressly incorporated by reference herein in its entirety.

BACKGROUND

Technical Field

The present disclosure relates generally to communication systems, and more particularly, to a method and apparatus for dynamically switching physical downlink control channel (PDCCH) monitoring groups.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a user equipment (UE) and a base station. The base station may transmit, to the UE, a configuration for a plurality of PDCCH monitoring groups for monitoring different sets of search spaces. The plurality of PDCCH monitoring groups may include a first PDCCH monitoring group with a first number of PDCCH monitoring occasions and a second PDCCH monitoring group with a second number of PDCCH monitoring occasions different from the first number. The base station may determine which PDCCH monitoring group to send a PDCCH, and transmit, using the determined PDCCH monitoring group, the PDCCH to the UE. The UE may determine to monitor search spaces of the PDCCH monitoring group, and monitor search spaces corresponding to the PDCCH monitoring group. The UE may switch between the first and second PDCCH monitoring groups based on a condition or an indication from the base station. The condition may include at least one of an amount of communication traffic, an expected amount of communication traffic, a characteristic of the communication traffic, a temperature, a time, or a light detection. The indication from the base station may be received in a downlink control information (DCI) or implicitly through one of a minimum $K_0$ or a minimum $K_2$ value. The UE may transmit the request to change the PDCCH monitoring group to monitor to the base station.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
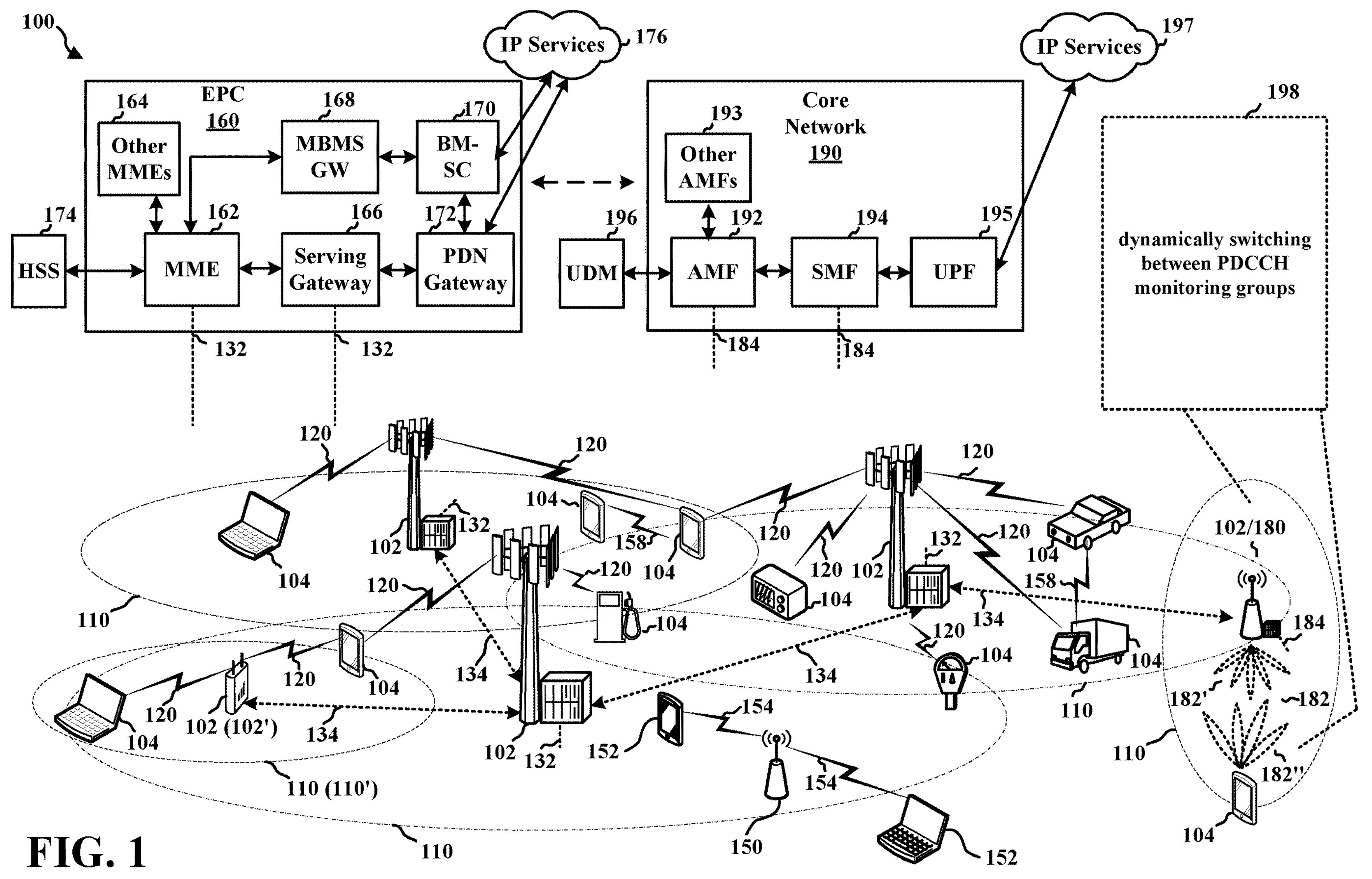
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 and the base station 180 may be configured to dynamically switch between physical downlink control channel (PDCCH) monitoring groups (198). Although the following description may be focused on 5G NR, the concepts described herein may be applicable to other similar areas, such as LTE, LTE-A, CDMA, GSM, and other wireless technologies.

Figures 2A, 2B, 2C, 2D:
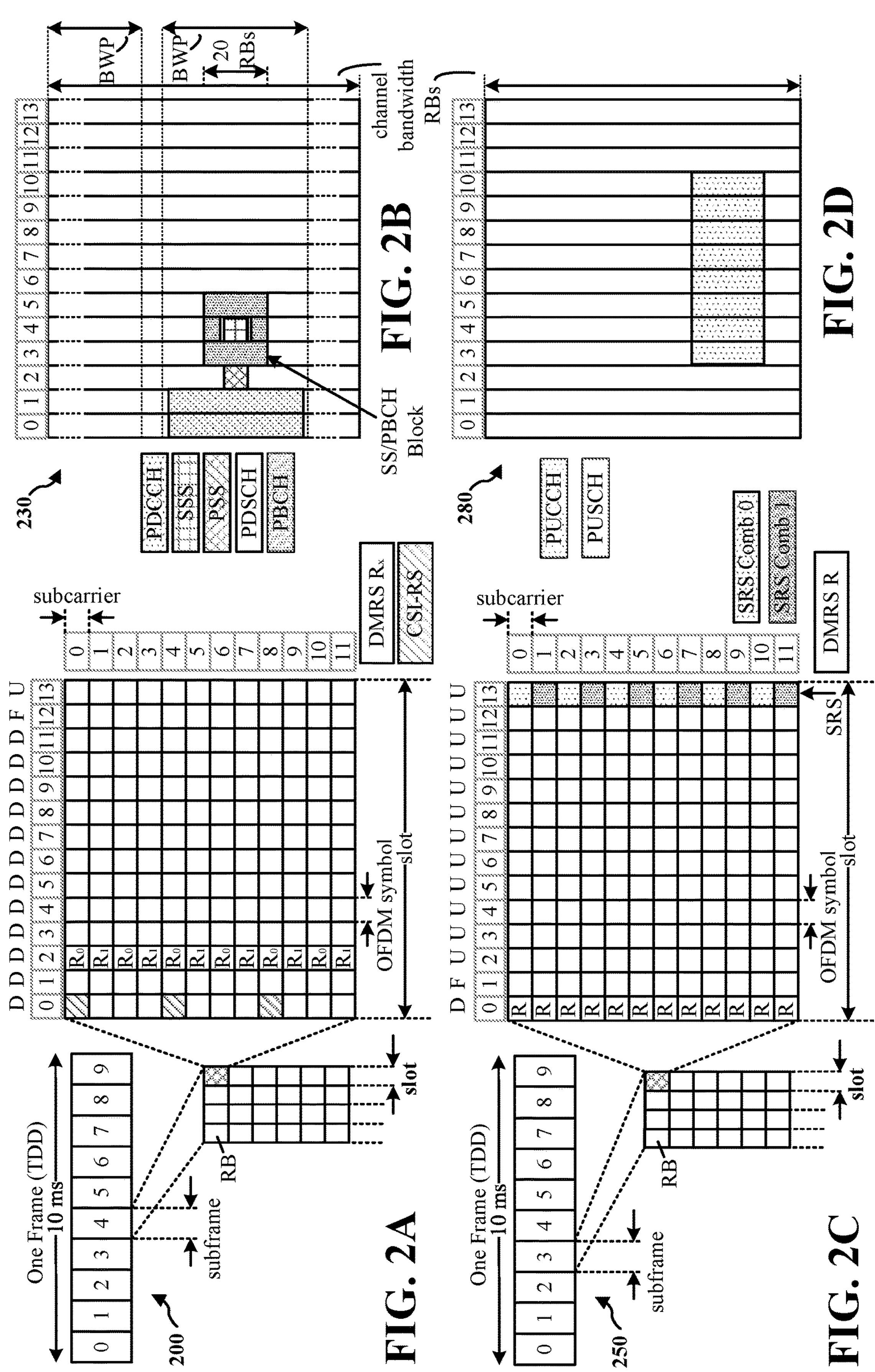
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^{\mu}$ slots/subframe. The subcarrier spacing and symbol length/duration are a function of the numerology. The subcarrier spacing may be equal to $2^{\mu}*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) ACK/NACK feedback. The PUSCH carries data, and may additionally be used to carry a buffer status report (BSR), a power headroom report (PHR), and/or UCI.

Figure 3:
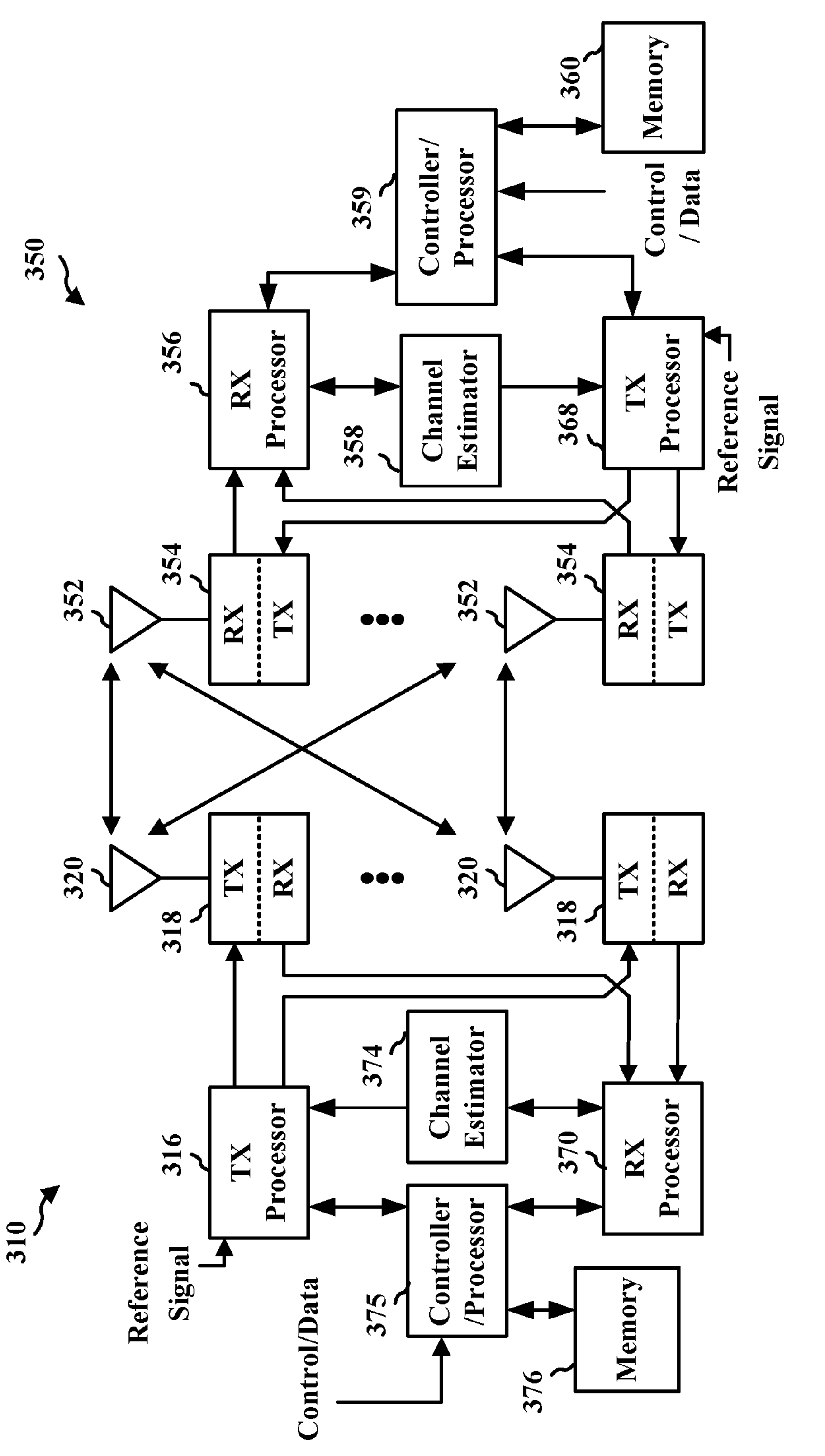
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/ processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1. At least one of the TX processor 316, the RX processor 370, and the controller/processor 375 may be configured to perform aspects in connection with 198 of FIG. 1.

Unlicensed Spectrum of NR may be referred to as NR-U. In the NR-U, dynamic PDCCH monitoring group switching is designed to support the functionality to switch between mini-slot based monitoring outside a channel occupancy time (COT) and inside the COT. A channel occupancy time is a sum of packet transfer time of each transmission of the packet until the packet is successfully been transmitted or the packet is dropped as a result of an undeliverable failure. The packet transfer time is defined as a total time required to transfer a data packet, which may include a sum of i) the transmission time of the data packet, ii) the transmission time of acknowledge (ACK) packets when necessary, iii) propagation delays for both the data and ACK packets, and iv) the inter-frame idle periods necessary for a channel to be idle before accessing the channel.

A radio resource control (RRC) may configure multiple PDCCH monitoring groups for transmitting PDCCH to the UE and the UE may dynamically switch among the monitoring groups. That is, the base station may transmit a RRC message to the UE to configure a plurality of PDCCH monitoring groups, and the UE may dynamically switch between the monitoring groups. The PDCCH monitoring groups may be associated with at least one search space. The search spaces for receiving the PDCCH may be UE-specific. That is, the UE may be configured to monitor the UE-specific search spaces associated to the PDCCH monitoring groups indicated by the RRC message to receive the PDCCH. The search space sets that are not part of the configured groups (e.g., a common search space (SS) set) will always be monitored by the UE regardless of the search space set indication. A single search space set may be part of more than one group.

For example, the multiple PDCCH monitoring groups may include group 0 and group 1. The UE-specific search spaces only associated with the group 0 may be monitored by the UE when the group 0 is active. The UE-specific search spaces only associated with the group 1 may be monitored by the UE when the group 1 is active. The UE-specific search spaced associated with both the group 0 and group 1, or The common search space set not associated with the group 0 or the group 1 may be always monitored by the UE.

Figure 11:
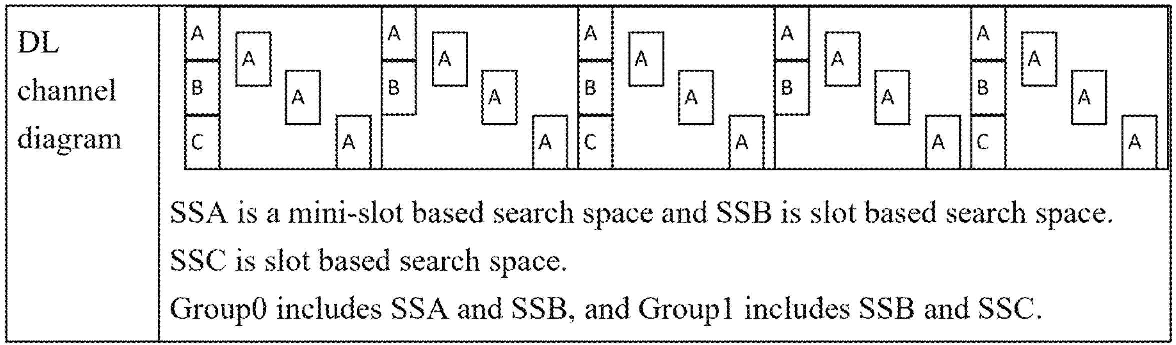
FIG. 11 is a diagram illustrating an example of dynamic switching of PDCCH monitoring groups.

An example of dynamic switching of PDCCH monitoring groups is illustrated in FIG. 11. FIG. 11 illustrates an example DL channel, including three different search spaces SSA, SSB, and SSC, and two PDCCH monitoring groups group0 and group1.

For industry internet of things (IoT), the industry IoT terminals may have variable service patterns. For example, at some specific time, massive number of terminals may need to be connected in the same slot, or the terminals may require low latency service. For another example, multiple sensors may share a single transmit/receiver, while different sensors may have different packet patterns.

Dynamic PDCCH monitoring groups switching (or automatic PDCCH monitoring group switching) can be used for industry IoT to improve the service quality. The automatic PDCCH monitoring group switching pattern may have a pre-determined time pattern, based on the use cases such as a deterministic traffic pattern. That is, the automatic PDCCH monitoring group switching may be based on various conditions. For example, the dynamic PDCCH monitoring group switching may be based on one of an amount of communication traffic, an expected amount of communication traffic, a characteristic of the communication traffic, temperature, time, or light detection. The UE may also provide a request to the base station to switch, based on the use cases that the UE knows there is an urgent traffic coming, triggered by the UL traffic. Here, the urgent traffic may refer to traffic that is delay sensitive, and therefore, the base station and the UE may switch to the PDCCH monitoring group having a shorter periodicity to transmit the PDCCH and monitor to receive the PDCCH.

Different kinds of sensors are used in industrial IoT system. Different types of the sensors may have different communication patterns with different parameters and functions such as temperature measured, and light detection, etc. Dynamically switching the monitoring group in the event-based manner may improve the communication performance.

According to a first aspect of the disclosure, a PDCCH monitoring group may be switch automatically based on a pre-determined pattern. For example, there may be a deterministic traffic pattern in which the amount of traffic changes from a first amount of traffic to a second amount of traffic. That is, the base station may determine the search spaces corresponding to one of the PDCCH monitoring groups based on a pattern in which to transmit the PDCCH to the UE, and the UE may determine to monitor the search spaces corresponding to the one of the PDCCH monitoring groups based on the pattern. For example, the amount of data traffic may vary in a deterministic pattern and the base station and the UE may select one of the monitoring groups based on certain characteristics or needs of the data traffic amounts. The pre-determined pattern may be known to both the base station and the UE. That is, the UE and the base station may share the pre-determined pattern, such that the UE and the base station may switch among the PDCCH monitoring groups without using any signaling to initiate the switching between the monitoring groups. Accordingly, the PDCCH monitoring group may be dynamically switched without an increased signaling overhead.

In another example, the base station may transmit an indication to UE to trigger the dynamic switching of the PDCCH monitoring group. The indication from the base station to the UE may be implemented to override the pre-determined pattern. The indication from the base station to the UE may help avoid or reduce a mismatch between the base station and the UE with respect to the monitoring group and/or when to switch monitoring groups. For example, at a specific time, the base station and the UE may know that there is urgent traffic coming, which requires the UE and the base station to switch to a search space with a shorter periodicity. However, if the UE does not receive the indication from the base station to switch the search space, the UE may continue to use the original search space with longer periodicity since the base station had not decide to switch for some reasons, such as limitation in the resources. That is, the use of the indication allows the base station and the UE to continue using the existing search space when the base station determines that there is not sufficient resources to switch to the other search space.

According to a second aspect of the disclosure, the UE may send a switching request to the base station. That is, the switching of the search spaces may be triggered by the UE based on the UL traffic. For example, when the UE knows that there is urgent traffic coming, the UE may determine to switch to the PDCCH monitoring group with a shorter periodicity and with more PDCCH monitoring occasions.

For example, the UE may transmit the switch request using a new format of a medium access control (MAC) control element (CE) (MAC-CE). The new MAC-CE may carry information known by the UE or to indicate that the UE detects delay sensitive DL data is coming. The new MAC-CE may be used to signal to the base station to switch to more frequent DL scheduling to detect delay sensitive DL data.

Figure 4:
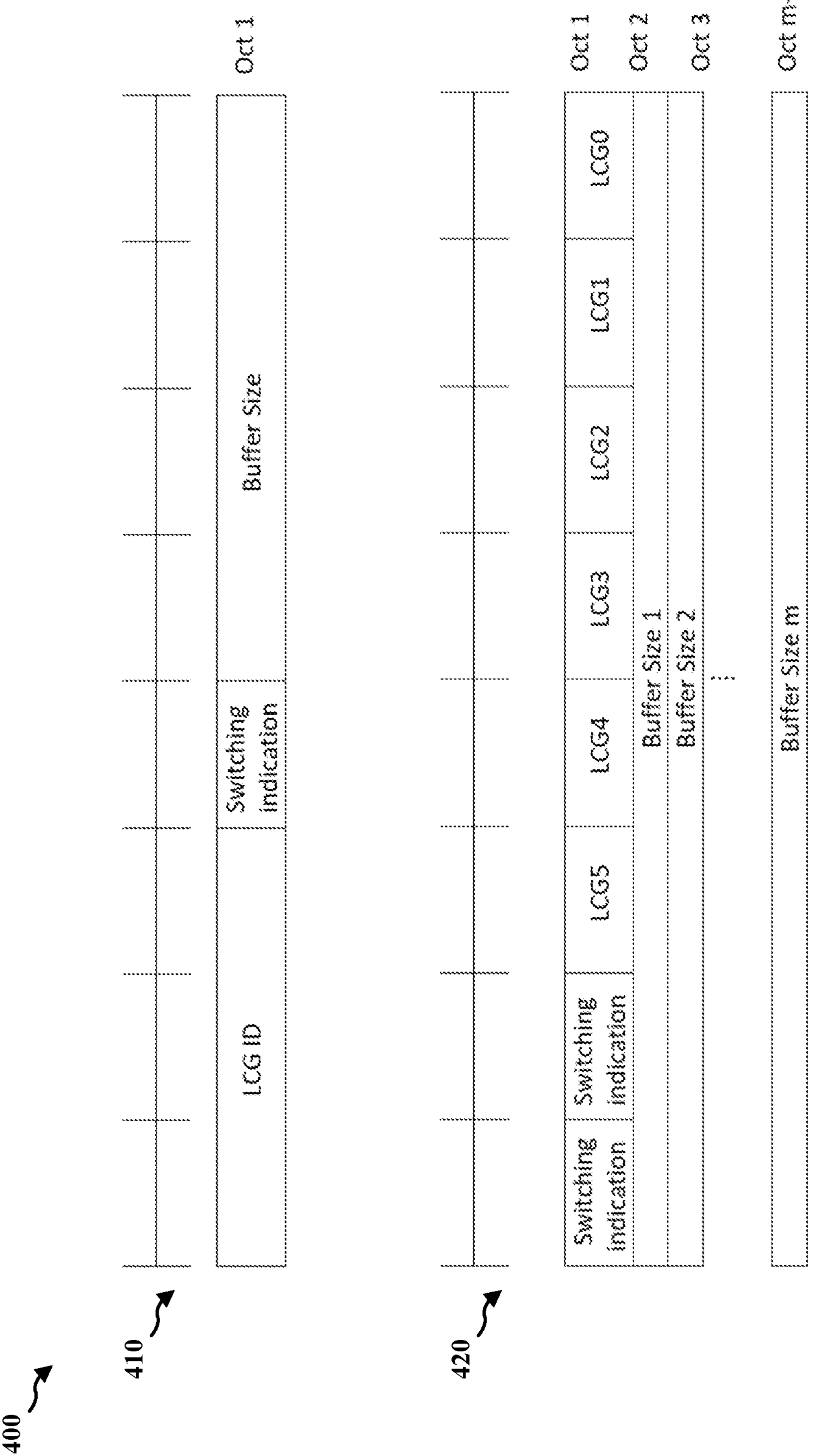
FIG. 4 is illustrates examples of a buffer status report (BSR) control element (CE) (BSR-CE) according to aspects of the present disclosure.

In another example, the UE may transmit the request to switch the search spaces via a BSR-CE. FIG. 4 illustrates examples of the BSR-CE according to aspects of the present disclosure.

Referring to FIG. 4, the UE may transmit the switch request using a short BSR-CE or a long BSR-CE. The short BSR-CE 410 may include 3 bits for a logical channel group (LCG) ID (LCG ID) and 5 bits for the buffer size. The UE may use one bit, for example, the $5^{th}$ bit following the 4 bits allocated for the buffer size to transmit the switch request to the base station. Since industrial IoT devices may not require a large buffer size, the UE may use the remaining bit to indicate which PDCCH monitoring group the UE wants to switch to. FIG. 4 illustrates that the UE may transmit the switch request in the 4th bit of the short BSR-CE 410, but the embodiments are not limited thereto, and the UE may use any one bit of the 5 bits allocated for the buffer size in the short BSR-CE 410.

The long BSR-CE 420 may include 8 bits for the LCG ID. The UE may transmit the switch request via the bits allocated for the LCGs. For example, the long BSR-CE 420 illustrates that the switch request may be transmitted in both the LCG7 and the LCG6 to support between more than two groups. Since the industrial IoT devices may not require a large number of LCG IDs, the UE may use the remaining bits in the unused LCG IDs to indicate which PDCCH monitoring group the UE wants to be in, without changing the buffer fields. FIG. 4 illustrates that the UE may transmit the switch requests in the LCG6 and the LCG7 bits of the LCG ID of the long BSR-CE 420, but the embodiments are not limited thereto, and the UE may use any bits of the LCG ID of the long BSR-CE 420.

According to a third aspect of the disclosure, the base station may indicate the switching of the PDCCH monitoring group using a minimum $K_0$ value and/or a minimum $K_2$ value. In the NR-U, the base station may trigger the switching of the PDCCH monitoring group using explicit and implicit conditions. Particularly, the base station may explicitly instruct the UE to switch the PDCCH monitoring group using a dedicated bit included in DCI sent via PDCCH or group common (GC) PDCCH (GC-PDCCH). The base station may implicitly instruct the UE to switch the PDCCH monitoring group using a COT start detection and COT end. In addition to using the mechanisms mentioned above to trigger the switching, the minimum $K_0$ value and/or the minimum $K_2$ value may also be used to trigger the switching.

Figure 5:
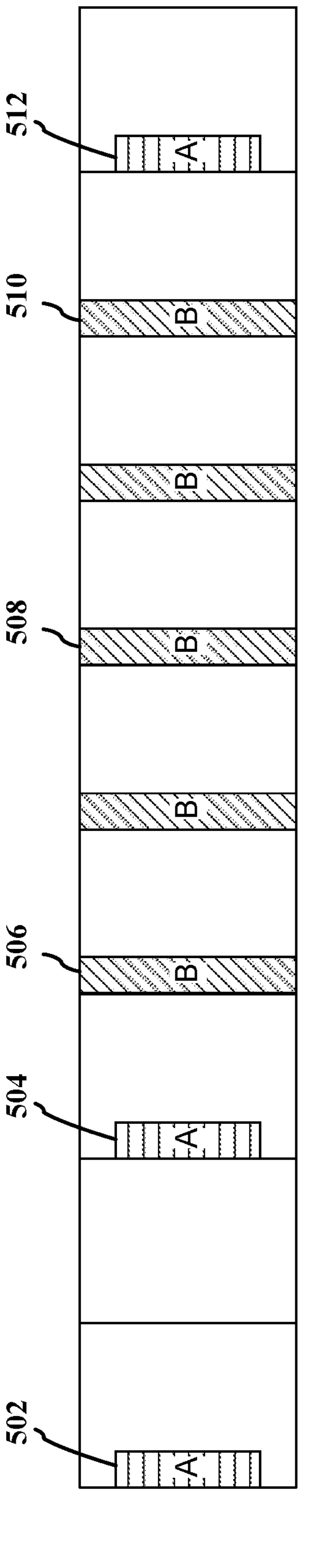
FIG. 5 is a diagram illustrating an example DL channel of the present disclosure.

The minimum $K_0$ value and/or the minimum $K_2$ value may be configured by RRC per bandwidth part (BWP) and/or 1-bit in the DCI to indicate change between up to 2 preconfigured values. The $K_0$ may be used to calculate the time domain allocation for a physical downlink shared channel (PDSCH). The $K_2$ may be used to calculate the time domain allocation for a physical uplink shared channel (PUSCH). Accordingly, a low minimum $K_0$ value and/or a minimum $K_2$ value translates to more frequent channel scheduling. Therefore, the base station may transmit the low minimum $K_0$ value and/or the minimum $K_2$ value to the UE to inform that a delay sensitive DL data will be transmitted, implicitly instructing the UE to switch to the PDCCH monitoring group and monitor the search spaces associated with the PDCCH monitoring group. Furthermore, based on the minimum $K_0$ value and/or the minimum $K_2$ value, the base station may use at least one bit in the DCI to explicitly indicate the PDCCH monitoring group switching FIG. 5 is a diagram 500 illustrating an example DL channel of the present disclosure. The example DL channel 500 may include a Group0 and a Group1. The Group0 may include the search space A 502 and the search space A 504, which have a longer periodicity. The Group1 may include the search spaces B 506 and B 508, which have a shorter periodicity. The DCI may include a bit I to indicate the minimum $K_0$ value. For example, I=0 may indicate a small minimum K0 value, and I=1 may indicate a large minimum K0 value. The UE may, upon receiving the DCI with the I=0 value determine that the UE should be in group 1, The UE may, upon receiving the DCI value of 1=1, (indicating a larger minimum K0 value), determine that the UE should be in group 0.

Particularly, in the first search space A 502, the UE may receive the DCI with the I=1, indicating that the UE may stay in the search space A corresponding to the Group0. In the following second search space A 504, the UE may receive the DCI with the I=0, indicating that the UE may switch to the search space B corresponding to the Group1. Accordingly, the UE may switch to monitoring the search space B 506 corresponding to the Group1. In the third search space B 508, the UE may receive the DCI with the I=0, indicating that the UE may stay in the search space B corresponding to the Group1. In the fifth search space B 510, the UE may receive the DCI with the I=1, indicating that the UE may switch to the search space A corresponding to the Group0. Accordingly, the UE may timely switch to monitoring the search space A 512 corresponding to the Group0.

Figure 6:
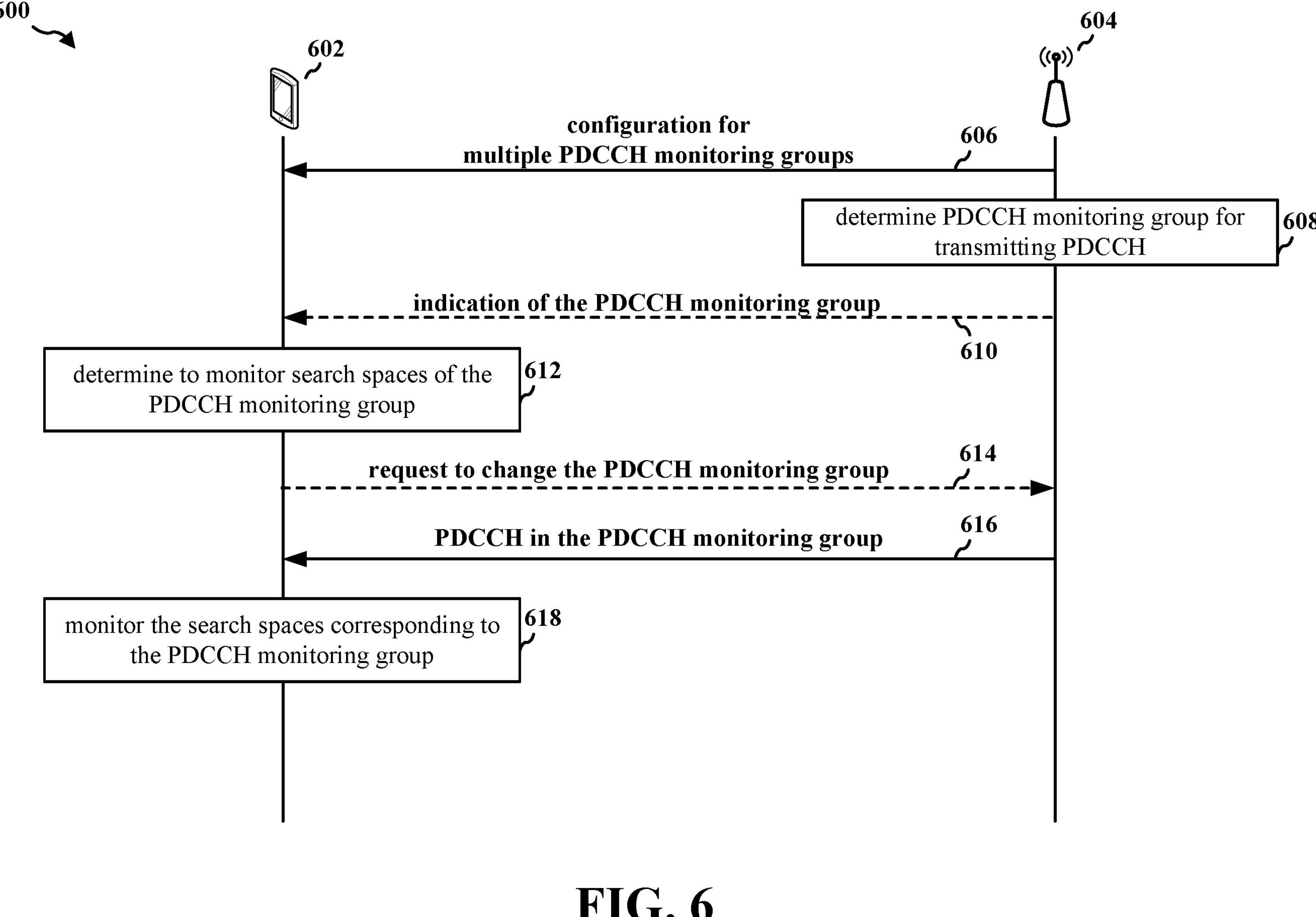
FIG. 6 is a call flow diagram of the wireless communication.

FIG. 6 is a call flow diagram 600 of the wireless communication.

At 606, the base station 604 may transmit a configuration for multiple PDCCH monitoring groups. That is, the base station 604 may transmit the configuration for a plurality of PDCCH monitoring groups to the UE 602 to monitor different sets of search spaces. For example, the PDCCH monitoring groups may include a first PDCCH monitoring group with a first number of PDCCH monitoring occasions, and a second PDCCH monitoring group with a second number of PDCCH monitoring occasions different from the first number of PDCCH monitoring occasions. The configuration for the multiple PDCCH monitoring groups may be sent via an RRC message.

At 608, the base station 604 may determine the search spaces corresponding to one of the PDCCH monitoring groups used to transmit the PDCCH to the UE 602. For example, when the multiple of PDCCH monitoring groups include the first PDCCH monitoring group and the second PDCCH monitoring group, the base station 604 may determine whether to transmit the PDCCH to the UE in the search spaces corresponding to the first PDCCH monitoring group or the second PDCCH monitoring group.

At 612, the UE 602 may determine to monitor the search spaces corresponding to one of the PDCCH monitoring groups used to receive the PDCCH transmitted from the base station 604. For example, when the multiple PDCCH monitoring groups include the first PDCCH monitoring group and the second PDCCH monitoring group, the UE 602 may determine whether to monitor the search spaces corresponding to the first PDCCH monitoring group or the second PDCCH monitoring group to detect and receive the PDCCH.

At 616, the base station 604 may transmit the PDCCH to the UE 602 in the search spaces corresponding to the determined one of the multiple PDCCH monitoring groups. For example, when the multiple PDCCH monitoring groups include the first PDCCH monitoring group and the second PDCCH monitoring group, the base station 604 may transmit the PDCCH in the first PDCCH monitoring group or the second PDCCH monitoring group based on the determination of the search spaces corresponding to one of the PDCCH monitoring group to transmit the PDCCH to the UE 602 in the first PDCCH monitoring group or the second PDCCH monitoring group in 608.

At 618, the UE 602 may monitor the search space associated with the PDCCH monitoring group received from the base station 604 to receive the PDCCH from the base station 604. For example, when the multiple PDCCH monitoring groups include the first PDCCH monitoring group and the second PDCCH monitoring group, the UE 602 may monitor the search spaces corresponding to the one of the PDCCH monitoring groups that the base station 604 transmitted the PDCCH to the UE 602. That is, the UE monitors the first PDCCH monitoring group or the second PDCCH monitoring group in 616 based on the determination of the search spaces corresponding to one of the PDCCH monitoring group.

At 610, the base station 604 may transmit an indication to UE 602 to trigger the dynamic switching of the PDCCH monitoring groups. The indication from the base station 604 to the UE 602 may help avoid or reduce a mismatch in the PDCCH monitoring group between the base station 604 and the UE 602.

At 614, the UE 602 may send a request to change the PDCCH monitoring group to the base station 604. That is, the UE 602 may send a request to the base station 604 to switch the PDCCH monitoring group. For example, when the UE knows that there is an urgent traffic coming, the UE may determine to switch to the PDCCH monitoring group with a shorter periodicity and with more PDCCH monitoring occasions.

Figure 7:
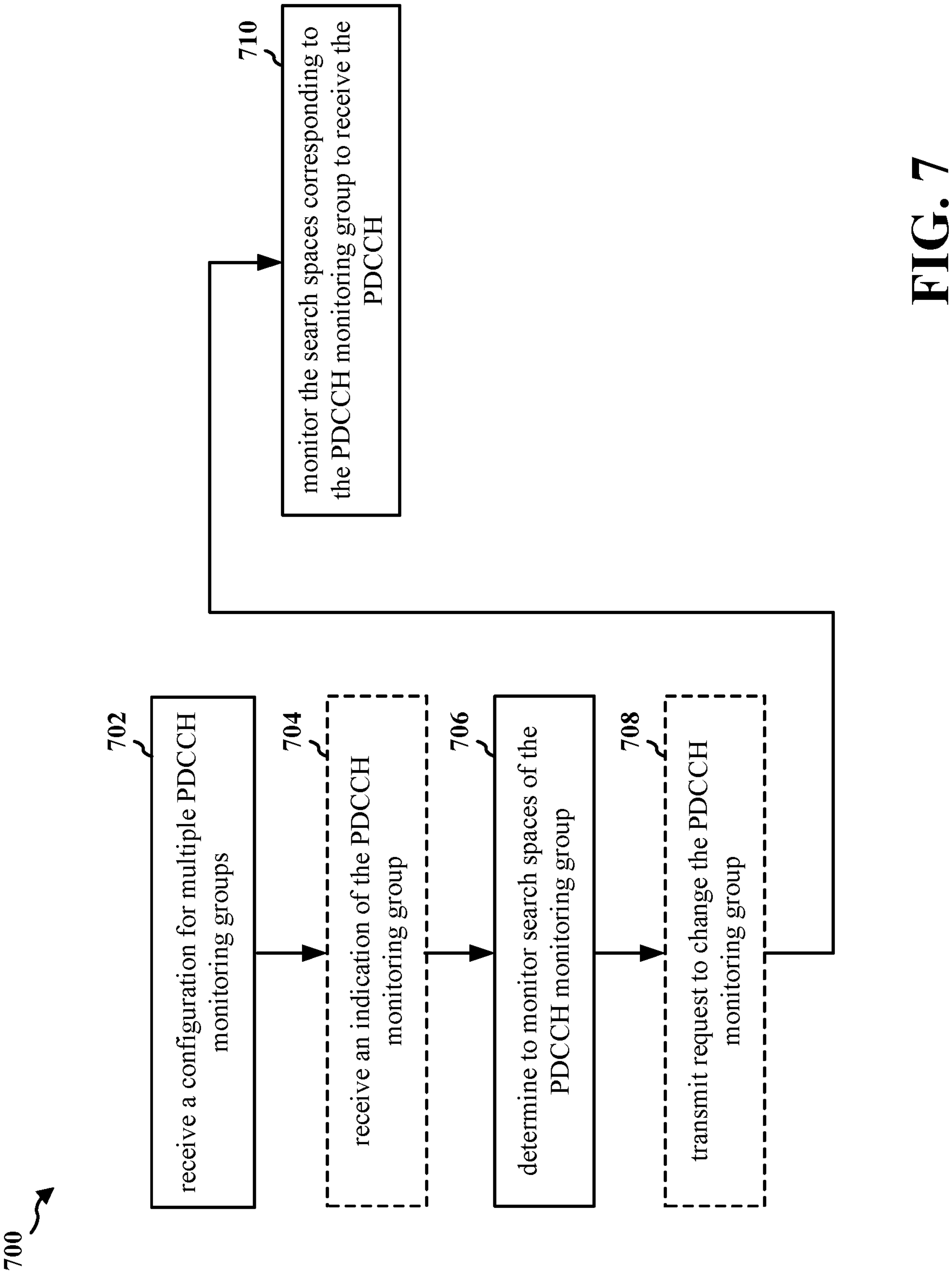
FIG. 7 is a flowchart of a method of wireless communication.

FIG. 7 is a flowchart 700 of a method of wireless communication. The method may be performed by a UE (e.g., the UE 104; the apparatus 902). At 702, the UE may receive a configuration having multiple PDCCH monitoring groups from a base station (606). For example, 702 may be performed by a PDCCH monitoring group managing Component 940.

At 704, the UE may receive an indication of the PDCCH monitoring group from the base station (610). For example, 704 may be performed by the PDCCH monitoring group managing Component 940.

At 706, the UE may determine to monitor the search spaces associated with the indicated PDCCH monitoring group (612). For example, 706 may be performed by the PDCCH monitoring group managing Component 940.

At 708, the UE may transmit a request to change the PDCCH monitoring group to the base station (614). For example, 708 may be performed by the PDCCH monitoring group managing Component 940.

Finally, at 710, the UE may monitor the search spaces corresponding to the PDCCH monitoring group (618). For example, 706 may be performed by a search space monitoring Component 942.

Figure 8:
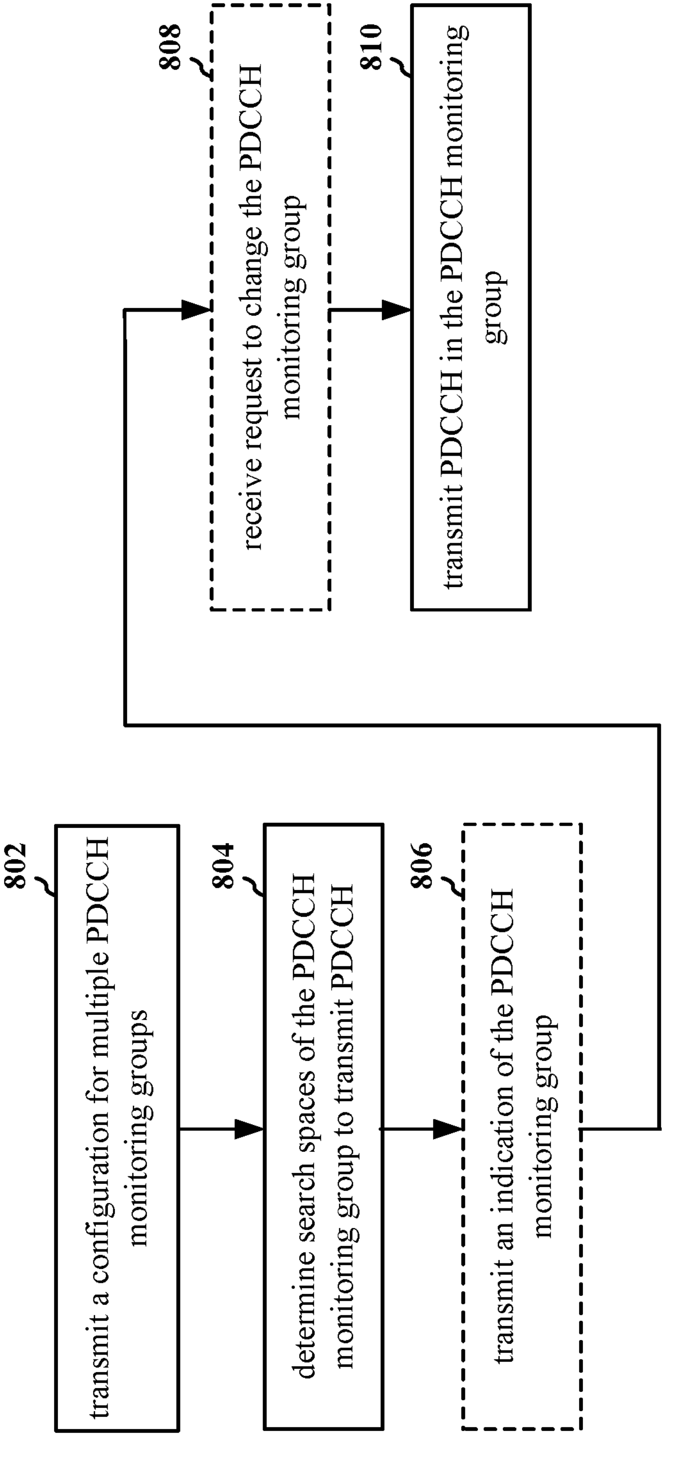
FIG. 8 is a flowchart of a method of wireless communication.

FIG. 8 is a flowchart 800 of a method of wireless communication. The method may be performed by a base station (e.g., the base station 102/180; the apparatus 802. At 802, the base station may transmit a configuration for multiple PDCCH monitoring groups to the UE (606). For example, 802 may be performed by a PDCCH monitoring group managing Component 1040.

At 804, the base station may determine the search spaces of the PDCCH monitoring group to transmit the PDCCH to the UE (608). For example, 804 may be performed by the PDCCH monitoring group managing Component 1040.

At 806, the base station may transmit an indication of the PDCCH monitoring group (610). For example, 806 may be performed by the PDCCH monitoring group managing Component 1040.

At 808, the base station may receive a request to change the PDCCH monitoring group from the UE (614). For example, 808 may be performed by the PDCCH monitoring group managing Component 1040.

Finally, at 810, the base station may transmit the PDCCH in the PDCCH monitoring group to the UE (616). For example, 810 may be performed by a PDCCH managing Component 1042.

Figure 9:
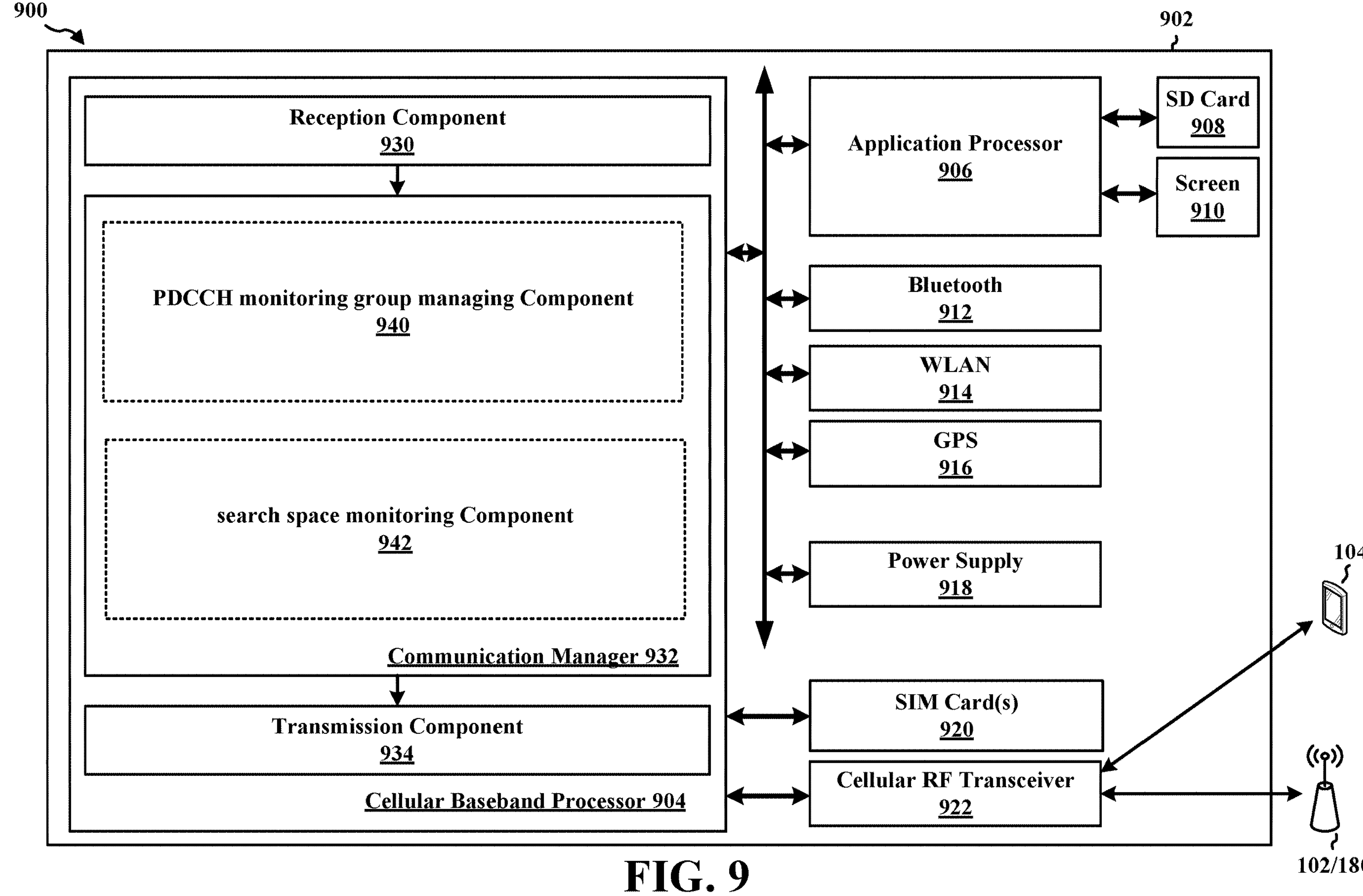
FIG. 9 is a diagram illustrating an example of a hardware implementation for an example apparatus.

FIG. 9 is a diagram 900 illustrating an example of a hardware implementation for an apparatus 902. The apparatus 902 is a UE and includes a cellular baseband processor 904 (also referred to as a modem) coupled to a cellular RF transceiver 922 and one or more subscriber identity modules (SIM) cards 920, an application processor 906 coupled to a secure digital (SD) card 908 and a screen 910, a Bluetooth module 912, a wireless local area network (WLAN) module 914, a Global Positioning System (GPS) module 916, and a power supply 918. The cellular baseband processor 904 communicates through the cellular RF transceiver 922 with the UE 104 and/or BS 102/180. The cellular baseband processor 904 may include a computer-readable medium/memory. The computer-readable medium/memory may be non-transitory. The cellular baseband processor 904 is responsible for general processing, including the execution of software stored on the computer-readable medium/memory. The software, when executed by the cellular baseband processor 904, causes the cellular baseband processor 904 to perform the various functions described supra. The computer-readable medium/memory may also be used for storing data that is manipulated by the cellular baseband processor 904 when executing software. The cellular baseband processor 904 further includes a reception component 930, a communication manager 932, and a transmission component 934. The communication manager 932 includes the one or more illustrated components. The components within the communication manager 932 may be stored in the computer-readable medium/memory and/or configured as hardware within the cellular baseband processor 904. The cellular baseband processor 904 may be a component of the UE 350 and may include the memory 360 and/or at least one of the TX processor 368, the RX processor 356, and the controller/processor 359. In one configuration, the apparatus 902 may be a modem chip and include just the baseband processor 904, and in another configuration, the apparatus 902 may be the entire UE (e.g., see 350 of FIG. 3) and include the aforediscussed additional modules of the apparatus 902.

The communication manager 932 includes a PDCCH monitoring group managing Component 940 that is configured to receive a configuration for multiple PDCCH monitoring groups from a base station, receive an indication of the PDCCH monitoring group from the base station, determine to monitor the search spaces associated with the PDCCH monitoring group, or transmit a request to change the PDCCH monitoring group to the base station, e.g., as described in connection with 702, 704, 706, or 708. The communication manager 932 further includes a search space monitoring Component 942 that is configured to monitor the search spaces corresponding to the PDCCH monitoring group to receive the PDCCH, e.g., as described in connection with 710. The components 940 and 942 may be configured to communicate with each other.

The apparatus may include additional components that perform each of the blocks of the algorithm in the aforementioned flowcharts of FIGS. 4, 5, 6, and 7. As such, each block in the aforementioned flowcharts of FIGS. 4, 5, 6, and 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 902, and in particular the cellular baseband processor 904, includes means for receiving the configuration for the PDCCH monitoring groups for monitoring different sets of search spaces from the base station, means for determining whether to monitor the search spaces corresponding to the first PDCCH monitoring group or the second PDCCH monitoring group, means for monitoring the search spaces corresponding to one of the first PDCCH monitoring group or the second PDCCH monitoring group based on the determination to monitor the first PDCCH monitoring group or the second PDCCH monitoring group, means for receiving an indication from the base station indicating to the UE whether to monitor the first PDCCH monitoring group or the second PDCCH monitoring group, and means for transmitting the request to the base station indicating the request to change to monitoring one of the first PDCCH monitoring group or the second PDCCH monitoring group. The aforementioned means may be one or more of the aforementioned components of the apparatus 902 configured to perform the functions recited by the aforementioned means. As described supra, the apparatus 902 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 10:
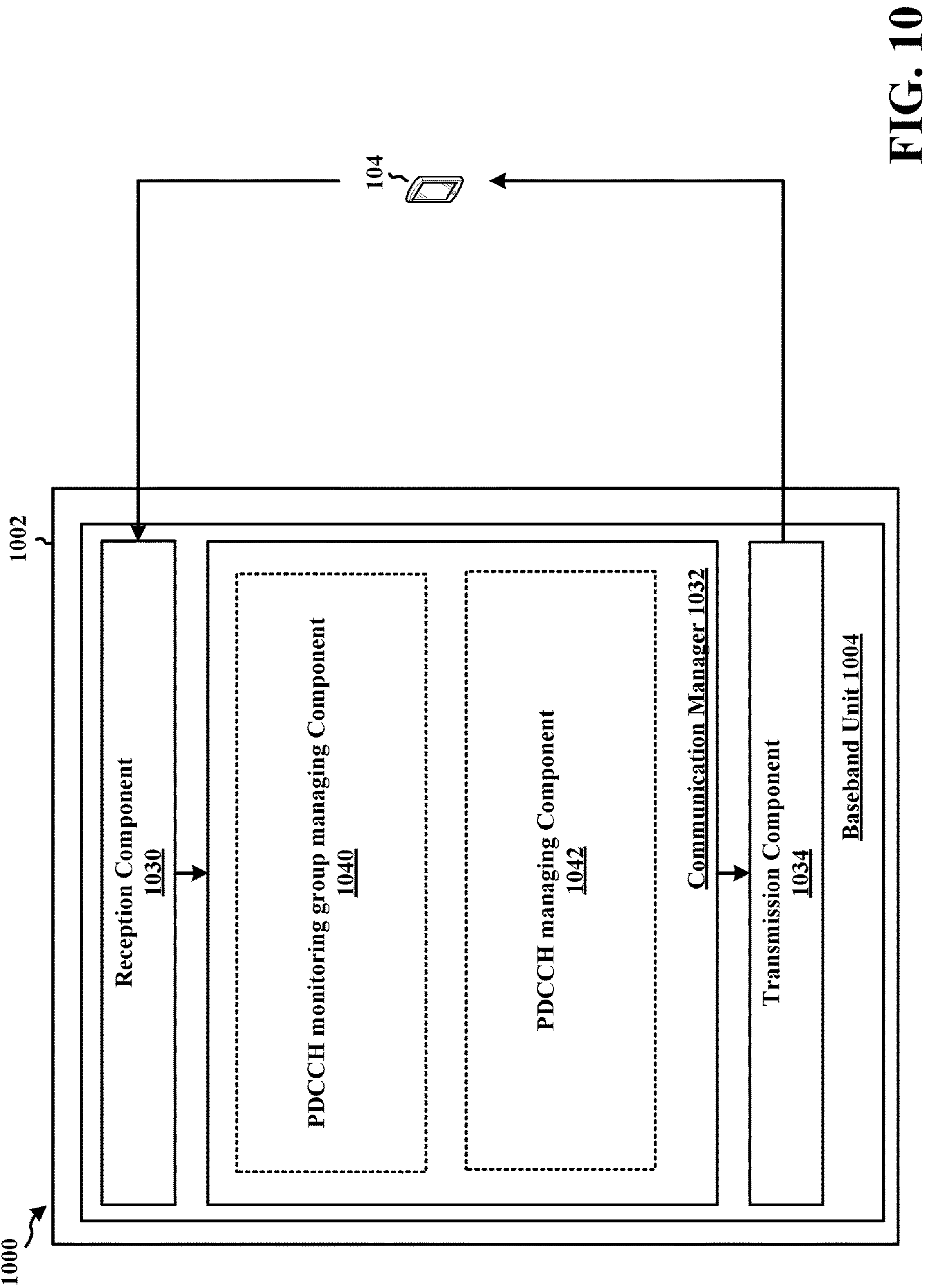
FIG. 10 is a diagram illustrating an example of a hardware implementation for an example apparatus.

FIG. 10 is a diagram 1000 illustrating an example of a hardware implementation for an apparatus 1002. The apparatus 1002 is a BS and includes a baseband unit 1004. The baseband unit 1004 may communicate through a cellular RF transceiver with the UE 104. The baseband unit 1004 may include a computer-readable medium/memory. The baseband unit 1004 is responsible for general processing, including the execution of software stored on the computer-readable medium/memory. The software, when executed by the baseband unit 1004, causes the baseband unit 1004 to perform the various functions described supra. The computer-readable medium/memory may also be used for storing data that is manipulated by the baseband unit 1004 when executing software. The baseband unit 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the baseband unit 1004. The baseband unit 1004 may be a component of the BS 310 and may include the memory 376 and/or at least one of the TX processor 316, the RX processor 370, and the controller/processor 375.

The communication manager 1032 includes a PDCCH monitoring group managing Component 1040 that is configured to transmit a configuration for multiple PDCCH monitoring groups to the UE, determine the search spaces of the PDCCH monitoring group to transmit the PDCCH to the UE, transmit an indication of the PDCCH monitoring group, and receive a request to change the PDCCH monitoring group from the UE, e.g., as described in connection with 802, 804, 806, and 808. The communication manager 1032 further includes a PDCCH managing Component 1042 that is configured to transmit the PDCCH in the PDCCH monitoring group to the UE, e.g., as described in connection with 810. The components 1040 and 1042 may be configured to communicate with each other.

The apparatus may include additional components that perform each of the blocks of the algorithm in the aforementioned flowcharts of FIGS. 4, 5, 6, and 8. As such, each block in the aforementioned flowcharts of FIGS. 4, 5, 6, and 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1002, and in particular the baseband unit 1004, includes means for transmitting the configuration for the plurality of PDCCH monitoring groups for monitoring different sets of search spaces to the UE, means for determining whether to transmit the PDCCH to the UE in the search spaces corresponding to the first PDCCH monitoring group or the second PDCCH monitoring group, means for transmitting the PDCCH to the UE in the search spaces corresponding to one of the first PDCCH monitoring group or the second PDCCH monitoring group based on the determination to transmit the PDCCH in the first PDCCH monitoring group or the second PDCCH monitoring group, means for transmitting an indication to the UE indicating to the UE whether to monitor the first PDCCH monitoring group or the second PDCCH monitoring group, means for receiving the request from the UE indicating the request to change to transmitting the PDCCH in one of the first PDCCH monitoring group or the second PDCCH monitoring group. The aforementioned means may be one or more of the aforementioned components of the apparatus 1002 configured to perform the functions recited by the aforementioned means. As described supra, the apparatus 1002 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

The apparatus may be a user equipment (UE) and a base station. The base station may transmit, to the UE, a configuration for a plurality of PDCCH monitoring groups for monitoring different sets of search spaces. The PDCCH monitoring groups may include a first PDCCH monitoring group with a first number of PDCCH monitoring occasions and a second PDCCH monitoring group with a second number of PDCCH monitoring occasions different from the first number. The base station may determine which PDCCH monitoring group to send a PHCCH, and transmit the PDCCH to the UE. The UE may determine to monitor search spaces of the PDCCH monitoring group, and monitor search spaces corresponding to the PDCCH monitoring group. The UE may switch between the first and second PDCCH monitoring groups based on a condition or an indication from the base station. The condition may include at least one of an amount of communication traffic, an expected amount of communication traffic, a characteristic of the communication traffic, temperature, time, or light detection. The indication from the base station may be received in a downlink control information (DCI) or implicitly through one of a minimum $K_0$ or a minimum $K_2$ value. The UE may transmit the request to change the PDCCH monitoring group to monitor to the base station. By dynamically switching the PDCCH monitoring group in the event-based manner may improve the communication performance of the UE and the base station.

Further disclosure is included in the Appendix.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following examples are illustrative only and may be combined with aspects of other embodiments or teachings described herein, without limitation.

What is claimed is:

1. A method of wireless communication of a user equipment (UE), comprising:

receiving, from a base station, a configuration for a plurality of physical downlink control channel (PDCCH) monitoring groups for monitoring different sets of search spaces, the plurality of PDCCH monitoring groups comprising a first PDCCH monitoring group with a first number of PDCCH monitoring occasions and a second PDCCH monitoring group with a second number of PDCCH monitoring occasions different from the first number of PDCCH monitoring occasions;

receiving an indication from the base station indicating to the UE whether to monitor the first PDCCH monitoring group or the second PDCCH monitoring group, wherein the indication is received implicitly through one of:

a minimum $K_0$ value from the base station indicating a time domain allocation for a physical downlink shared channel (PDSCH) less than a $K_0$ threshold, or a minimum $K_2$ value from the base station indicating a time domain allocation for a physical uplink shared channel (PUSCH) less than a $K_2$ threshold;

determining whether to monitor the search spaces corresponding to the first PDCCH monitoring group or the second PDCCH monitoring group, wherein the determining whether to monitor the search spaces corresponding to the first PDCCH monitoring group or the second PDCCH monitoring group comprises selecting a monitoring group with more PDCCH monitoring occasions of the first PDCCH monitoring group or the second PDCCH monitoring group in response to the minimum $K_0$ value being less than the $K_0$ threshold or the minimum $K_2$ value being less than the $K_2$ threshold; and monitoring the search spaces corresponding to one of the first PDCCH monitoring group or the second PDCCH monitoring group based on the determination to monitor the first PDCCH monitoring group or the second PDCCH monitoring group.

2. The method of claim 1, wherein the search spaces for receiving a PDCCH are UE-specific.

3. The method of claim 1, wherein the monitoring the search spaces comprises switching from monitoring the first PDCCH monitoring group to monitoring the second PDCCH monitoring group, or switching from monitoring the second PDCCH monitoring group to monitoring the first PDCCH monitoring group.

4. The method of claim 1, wherein the determining whether to monitor the search spaces corresponding to the first PDCCH monitoring group or the second PDCCH monitoring group is based on at least one of an amount of communication traffic, an expected amount of communication traffic, a characteristic of communication traffic, a temperature, a time, or a light detection.

5. The method of claim 1, wherein the indication is received in a downlink control information (DCI).

6. The method of claim 1, further comprising:

transmitting a request to the base station to change to monitoring one of the first PDCCH monitoring group or the second PDCCH monitoring group.

7. The method of claim 6, wherein the UE transmits the request over a medium access control (MAC) control element (CE) (MAC-CE).

8. The method of claim 6, wherein the UE transmits the request over a buffer status report (BSR) control element (CE) (BSR-CE).

9. An apparatus for wireless communication of a user equipment (UE), comprising:

means for receiving, from a base station, a configuration for a plurality of physical downlink control channel (PDCCH) monitoring groups for monitoring different sets of search spaces, the plurality of PDCCH monitoring groups comprising a first PDCCH monitoring group with a first number of PDCCH monitoring occasions and a second PDCCH monitoring group with a second number of PDCCH monitoring occasions different from the first number of PDCCH monitoring occasions;

means for receiving an indication from the base station indicating to the UE whether to monitor the first PDCCH monitoring group or the second PDCCH monitoring group, wherein the indication is received implicitly through one of:

a minimum Ko value from the base station indicating a time domain allocation for a physical downlink shared channel (PDSCH) less than a Ko threshold, or a minimum K2 value from the base station indicating a time domain allocation for a physical uplink shared channel (PUSCH) less than a K2 threshold;

means for determining whether to monitor the search spaces corresponding to the first PDCCH monitoring group or the second PDCCH monitoring group, wherein the determining whether to monitor the search spaces corresponding to the first PDCCH monitoring group or the second PDCCH monitoring group comprises selecting a monitoring group with more PDCCH monitoring occasions of the first PDCCH monitoring group or the second PDCCH monitoring group in response to the minimum Ko value being less than the Ko threshold or the minimum K2 value being less than the K2 threshold; and means for monitoring the search spaces corresponding to one of the first PDCCH monitoring group or the second PDCCH monitoring group based on the determination to monitor the first PDCCH monitoring group or the second PDCCH monitoring group.

10. An apparatus for wireless communication of a user equipment (UE), comprising:

a memory; and at least one processor coupled to the memory and configured to:

receive, from a base station, a configuration for a plurality of physical downlink control channel (PDCCH) monitoring groups for monitoring different sets of search spaces, the plurality of PDCCH monitoring groups comprising a first PDCCH monitoring group with a first number of PDCCH monitoring occasions and a second PDCCH monitoring group with a second number of PDCCH monitoring occasions different from the first number of PDCCH monitoring occasions;

receive an indication from the base station indicating to the UE whether to monitor the first PDCCH monitoring group or the second PDCCH monitoring group, wherein the indication is received implicitly through one of:

a minimum $K_0$ value from the base station indicating a time domain allocation for a physical downlink shared channel (PDSCH) less than a $K_0$ threshold, or a minimum $K_2$ value from the base station indicating a time domain allocation for a physical uplink shared channel (PUSCH) less than a $K_2$ threshold;

determine whether to monitor the search spaces corresponding to the first PDCCH monitoring group or the second PDCCH monitoring group, wherein the determining whether to monitor the search spaces corresponding to the first PDCCH monitoring group or the second PDCCH monitoring group comprises selecting a monitoring group with more PDCCH monitoring occasions of the first PDCCH monitoring group or the second PDCCH monitoring group in response to the minimum $K_0$ value being less than the $K_0$ threshold or the minimum $K_2$ value being less than the $K_2$ threshold; and monitor the search spaces corresponding to one of the first PDCCH monitoring group or the second PDCCH monitoring group based on the determination to monitor the first PDCCH monitoring group or the second PDCCH monitoring group.

11. The apparatus of claim 10, wherein the search spaces for receiving a PDCCH are UE-specific.

12. The apparatus of claim 10, wherein the at least one processor is configured to determine whether to monitor the search spaces corresponding to the first PDCCH monitoring group or the second PDCCH monitoring group based on at least one of an amount of communication traffic, an expected amount of communication traffic, a characteristic of communication traffic, a temperature, a time, or a light detection.

13. The apparatus of claim 10, wherein the at least one processor is further configured to:

transmit a request to the base station to change to monitoring one of the first PDCCH monitoring group or the second PDCCH monitoring group.

14. A method of wireless communication of a base station, comprising:

transmitting, to a user equipment (UE), a configuration for a plurality of physical downlink control channel (PDCCH) monitoring groups for monitoring different sets of search spaces, the plurality of PDCCH monitoring groups comprising a first PDCCH monitoring group with a first number of PDCCH monitoring occasions and a second PDCCH monitoring group with a second number of PDCCH monitoring occasions different from the first number of PDCCH monitoring occasions;

transmitting an indication to the UE indicating to the UE whether to monitor the first PDCCH monitoring group or the second PDCCH monitoring group, wherein the indication is transmitted implicitly through one of:

a minimum $K_0$ value from the base station indicating a time domain allocation for a physical downlink shared channel (PDSCH) less than a $K_0$ threshold, or a minimum $K_2$ value from the base station indicating a time domain allocation for a physical uplink shared channel (PUSCH) less than a $K_2$ threshold;

determining whether to transmit a PDCCH to the UE in the search spaces corresponding to the first PDCCH monitoring group or the second PDCCH monitoring group, wherein the determining whether to transmit the PDCCH to the UE in the search spaces corresponding to the first PDCCH monitoring group or the second PDCCH monitoring group comprises selecting a monitoring group with more PDCCH monitoring occasions of the first PDCCH monitoring group or the second PDCCH monitoring group in response to the minimum $K_0$ value being less than the $K_0$ threshold or the minimum $K_2$ value being less than the $K_2$ threshold; and transmitting the PDCCH to the UE in the search spaces corresponding to one of the first PDCCH monitoring group or the second PDCCH monitoring group based on the determination to transmit the PDCCH in the first PDCCH monitoring group or the second PDCCH monitoring group.

15. The method of claim 14, wherein the search spaces for transmitting a PDCCH are UE-specific.

16. The method of claim 14, wherein the transmitting the PDCCH to the UE in the search spaces comprises switching from transmitting the PDCCH in the first PDCCH monitoring group to transmitting the PDCCH in the second PDCCH monitoring group, or switching from transmitting the PDCCH in the second PDCCH monitoring group to transmitting the PDCCH in the first PDCCH monitoring group.

17. The method of claim 14, wherein the determining whether to transmit a PDCCH to the UE in the search spaces corresponding to the first PDCCH monitoring group or the second PDCCH monitoring group is based on at least one of an amount of communication traffic, an expected amount of communication traffic, a characteristic of communication traffic, a temperature, a time, or a light detection.

18. The method of claim 14, wherein the indication is transmitted in a downlink control information (DCI).

19. The method of claim 14, further comprising:

receiving a request from the UE to change to transmitting the PDCCH in one of the first PDCCH monitoring group or the second PDCCH monitoring group.

20. The method of claim 19, wherein the request is received over a medium access control (MAC) control element (CE) (MAC-CE).

21. The method of claim 19, wherein the request is received over a buffer status report (BSR) control element (CE) (BSR-CE).

22. An apparatus for wireless communication of a base station, comprising:

a memory; and at least one processor coupled to the memory and configured to:

transmit, to a user equipment (UE), a configuration for a plurality of physical downlink control channel (PDCCH) monitoring groups for monitoring different sets of search spaces, the plurality of PDCCH monitoring groups comprising a first PDCCH monitoring group with a first number of PDCCH monitoring occasions and a second PDCCH monitoring group with a second number of PDCCH monitoring occasions different from the first number of PDCCH monitoring occasions;

transmit an indication to the UE indicating to the UE whether to monitor the first PDCCH monitoring group or the second PDCCH monitoring group, wherein the indication is transmitted implicitly through one of:

a minimum Ko value from the base station indicating a time domain allocation for a physical downlink shared channel (PDSCH) less than a Ko threshold, or a minimum $K_2$ value from the base station indicating a time domain allocation for a physical uplink shared channel (PUSCH) less than a $K_2$ threshold;

determine whether to transmit a PDCCH to the UE in the search spaces corresponding to the first PDCCH monitoring group or the second PDCCH monitoring group, wherein the determining whether to transmit the PDCCH to the UE in the search spaces corresponding to the first PDCCH monitoring group or the second PDCCH monitoring group comprises selecting a monitoring group with more PDCCH monitoring occasions of the first PDCCH monitoring group or the second PDCCH monitoring group in response to the minimum Ko value being less than the Ko threshold or the minimum K2 value being less than the K2 threshold; and transmit the PDCCH to the UE in the search spaces corresponding to one of the first PDCCH monitoring group or the second PDCCH monitoring group based on the determination to transmit the PDCCH in the first PDCCH monitoring group or the second PDCCH monitoring group.

23. The apparatus of claim 22, wherein the search spaces for transmitting a PDCCH are UE-specific.

24. The apparatus of claim 22, wherein the at least one processor is configured to determine whether to transmit a PDCCH to the UE in the search spaces corresponding to the first PDCCH monitoring group or the second PDCCH monitoring group based on at least one of an amount of communication traffic, an expected amount of communication traffic, a characteristic of communication traffic, a temperature, a time, or a light detection.

25. The apparatus of claim 22, wherein the at least one processor is further configured to:

receive a request from the UE to change to transmitting the PDCCH in one of the first PDCCH monitoring group or the second PDCCH monitoring group.

* * * * *